US008066225B1

United States Patent
Tigner

(10) Patent No.: US 8,066,225 B1
(45) Date of Patent: Nov. 29, 2011

(54) MULTI-TETHER CROSS-WIND KITE POWER

(76) Inventor: Benjamin Tigner, Laguna Beach, CA (US)

( * ) Notice: Subject to any disclaimer, the term of this patent is extended or adjusted under 35 U.S.C. 154(b) by 494 days.

(21) Appl. No.: 12/355,963

(22) Filed: Jan. 19, 2009

Related U.S. Application Data

(60) Provisional application No. 61/024,969, filed on Jan. 31, 2008.

(51) Int. Cl.
*B64C 31/06* (2006.01)
(52) U.S. Cl. ............ 244/153 R; 244/33; 290/44; 290/55
(58) Field of Classification Search .............. 244/33, 244/153 R, 154, 155 R, 155 A, 153 A; 290/44, 290/55
See application file for complete search history.

(56) References Cited

U.S. PATENT DOCUMENTS

| | | | | |
|---|---|---|---|---|
| 3,924,827 | A * | 12/1975 | Lois | 244/153 R |
| 3,987,987 | A * | 10/1976 | Payne et al. | 244/153 R |
| 4,076,190 | A * | 2/1978 | Lois | 244/153 R |
| 4,309,006 | A * | 1/1982 | Biscomb | 244/33 |
| 4,572,962 | A * | 2/1986 | Shepard | 290/55 |
| 6,781,254 | B2 * | 8/2004 | Roberts | 290/55 |
| 7,109,598 | B2 * | 9/2006 | Roberts et al. | 290/44 |
| 7,656,053 | B2 * | 2/2010 | Griffith et al. | 290/44 |
| 2003/0066934 | A1 * | 4/2003 | Bolonkin | 244/153 R |

OTHER PUBLICATIONS

Maples, Dupree, et al. "Design and Construction of a Remote Sensing Apparatus." NASA-CR-124219. May 1973.*
Loyd, M.L., Crosswind Kite Power, Journal of Energy, vol. 4, May-Jun. 1980, p. 106-111.
Roberts, B.W., et. al., Harnessing High Altitude Wind Power, IEEE Transaction on Energy Conversion, vol. 22, issue 1, Mar. 2007, p. 136-144.
http://www.ockels.nl/.
http://www.sequoiaonline.com/blogs/htm/immagini_eng.htm.

* cited by examiner

*Primary Examiner* — Tien Dinh
*Assistant Examiner* — Michael Kreiner
(74) *Attorney, Agent, or Firm* — Fish & Associates, PC

(57) ABSTRACT

A multiple-tethered kite extracts power from wind. Systems having three or more tethers coupled to a single kite are contemplated, as are systems having multiple kites coupled to a given pair of tethers. Commercially useful tethers would most likely have a length of at least 1000 meters, and would be fixed at least 100 meters apart. During a given cycle the distance between each of the bases and the kite would likely vary by at least 50 meters. Motion of the tethers can be converted to useful energy in any commercially viable manner, for example by driving an electric generator or a water pump.

10 Claims, 5 Drawing Sheets

MULTI-TETHER CROSS-WIND KITE POWER

PRIORITY

This application claims priority to U.S. provisional application Ser. No. 61/024,969 filed Jan. 31, 2008. That application, and all other extrinsic references identified herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is power extraction from high altitude wind using kites.

BACKGROUND

Kites have been used for centuries for a variety of purposes associated with art, sport, and military reconnaissance. As used herein, the term "kite" broadly includes any object that is tethered, and remains in the air under power of the wind. This includes, for example, common play kites, a tethered blimp (also known as an aerostat), and a tethered toy or other airplane, or rotorcraft.

It has recently been proposed to use kites to extract mechanical or electrical power from high altitude winds. The most promising of these ideas involve kites maneuvering at high speed in a flight pattern approximately cross-ways to the wind. Figure-eight (FIG. 1) or circular flight patterns have been proposed, but many variations are possible. It can easily be shown that a kite maneuvering in such a pattern can attain crosswind speeds far greater than the speed of the wind itself, with a fundamental limit of L/D, where L/D is the ratio of aerodynamic lift to aerodynamic drag. For a high performance kite, L/D can be up to 15 or more.

Several methods of generating power using kites have been described in the literature (see for example, Loyd, M. L., *Crosswind Kite Power*, Journal of Energy, vol. 4, May-June 1980, p. 106-111), including most notably lift power extraction, and drag power extraction. Lift power extraction uses kite tether tension to unwind a ground-mounted spool which turns a generator or other power conversion device. Drag power extraction uses the kite's crosswind lift to propel a wind turbine or other power extraction device through the air at high speed. By neglecting the weight of the kite and the weight and drag of the tether, it can easily be shown that both lift and drag power extraction methods offer the same power generation potential:

$$P = \frac{4}{27} \frac{C_L^3}{C_D^2} S_{ref} P_W$$

where $C_L$ and $C_D$ are the kite's lift and drag coefficients,
$S_{ref}$ is the reference area of the kite (usually the kite's projected planform area), and $$P_W = \frac{1}{2}\rho V_W^3$$

is the kinetic power density in the wind, where
$\rho$ is the mass density of the air, and
$V_W$ is the wind speed.

The value $S_{ref} P_W$ is proportional to the amount of power a conventional wind turbine of turbine-disk area $S_{ref}$ could extract from a terrestrial wind flow. The value of $$\frac{4}{27} \frac{C_L^3}{C_D^2}$$

can be as high as 30 to 50 for high performance kites traveling at high speed. This means that a properly engineered power kite might extract 30 to 50 times as much power as a conventional wind turbine of equivalent size.

All kite power extraction methods suffer severe performance penalties associated with the weight and drag of the tether. The degree of performance penalty depends principally on the value of $L_{tether}/\sqrt{S_{ref}}$, where $L_{tether}$ is the length of the tether from its anchor point to the kite attachment. Much of the tether drag penalty stems from the high drag coefficient of cylindrical cross section tethers and from the high flight speeds needed for efficient power extraction, so there is a benefit in keeping the portion of the tether which travels at high speed as short as possible. It is well known that winds above approximately 10,000 ft blow with greater intensity and are more reliable than wind near the ground. This motivates power kite designers to consider tethers up to $L_{tether} = 20,000$ ft or longer. Maintaining a $L_{tether}/\sqrt{S_{ref}}$ value below 100 to avoid excessive tether drag losses, the smallest feasible kite size is $S_{ref} = 50,000$ ft$^2$.

A variation on the drag power extraction method has been proposed, which uses kites with rotating rotors (see for example Roberts, B. W., et. al., *Harnessing High Altitude Wind Power*, IEEE Transaction on Energy Conversion, vol. 22, issue 1, March 2007, p, 136-144). In this method, a kite which includes rotating rotors generates power onboard the aircraft, and some of this power is transmitted to the ground using conductors integrated with the kite tether. The electrical power is generated by using torque from the rotor shaft to turn a generator on the aircraft. The method of Roberts, et. al., is similar to the drag power method proposed by Loyd because the rotor blades are being propelled through the air in a cross-wind fashion, and it is the cross-wind component of the blade-lift which is used to produce power.

A Y-harness tether configuration (FIG. 2) has been proposed to minimize tether drag without requiring excessively large kites. Such an arrangement is comprised of a long-static tether whose upper end is the anchor point for the shorter tethers of two or more separate kites. If the several kites can be controlled to fly in opposing patterns such that their common anchor point is subject to zero net force, then the anchor point will remain stationary. Since drag forces grow with the square of the air speed, the long lower part of the tether will not be subject to the high drag associated with the high-speed maneuvering flight, but the much lower drag associated with the wind speed.

In the lift power extraction method, the tether spool unwinds during power generation and must be rewound back onto the spool while not generating. This method is incapable of sustaining continuous power generation because of the need to rewind the tether, but the power required to rewind the tether can be a small fraction of the power generated during tether unwind.

In the drag power extraction method, electrical power is generated onboard the kite and transmitted to the ground through conducting cables integrated with the tether. Though the drag power extraction method offers the possibility of continuous power generation, the weight, drag, cost, and risk of the electrical conductors and airborne generating equipment reduce the potential for economic utility.

Two methods have been proposed which answer the need for continuous power generation without the cost, weight, drag, and risk associated with airborne conductors and generators. These methods are the Ladder Mill, and the Kite Wind Generator, each of which involves a series of kites tethered to ground-based generating equipment. Both methods introduce considerable logistical complexity in the control and management of the kites and their tethers. Each of these methods also pays a large performance penalty because neither method is conducive to the high-speed crosswind maneuver patterns that allow the most efficient energy extraction.

The preceding discussion has focused on operation of kite systems once they are airborne. Many of the proposed systems present logistical challenges for launch and recovery of the kites, especially in cases where the kites are too large to be hand-launched by human operators.

Given the prior art, a need still exists for a method of extracting power from high altitude winds which allows continuous power generation without the cost, weight, drag, and risk of airborne conductors and generators, but which avoids the logistical complexity and performance penalties of the Ladder Mill and the Kite Wind Generator, minimizes the effects of tether drag, and provides a natural method for launching large-scale kites.

SUMMARY OF THE INVENTION

The inventive subject matter provides apparatus, systems and methods in which a multiple-tethered kite extracts power from wind.

In preferred embodiments a system for deriving energy from a kite comprises: a kite or other flying object tethered by first and second tethers, the tethers having bases separated by a distance of at least 1 meter such that translational movement of the object causes a change in distance from the base of the first tether to the object; and a mechanism that derives power from the change in distance.

Contemplated kites can have any suitable wing area, and can be fabricated from any suitable material or materials.

Contemplated tethers can have any suitable length, and most likely would have a length of at least 1000 meters. The bases of the tethers for a given kite would generally be fixed at least 100 meters apart, and during a given cycle the distance between each of the bases and the kite would likely vary by at least 50 meters, and more preferably 100 meters or more.

Motion of the tethers can be converted to useful energy in any commercially viable manner. For example, the mechanism that derives power could comprise an electric generator, or a water pump. Typically, each base in a two or more tether system would have its own mechanism, but other configurations are also contemplated, including for example a single mechanism disposed between the bases.

In some instances it may be advantageous to fly a given kite using three or more tethers. An airborne joint can be used to couple multiple ground based tethers, and a secondary, completely airborne tether, could then couple the joint to the flying kite.

It is also contemplated that a given system of two or more tethers might derive power from flying two or more kites coupled together.

Various objects, features, aspects and advantages of the inventive subject matter will become more apparent from the following detailed description of preferred embodiments, along with the accompanying drawing figures in which like numerals represent like components.

DETAILED DESCRIPTION

Figure 3:
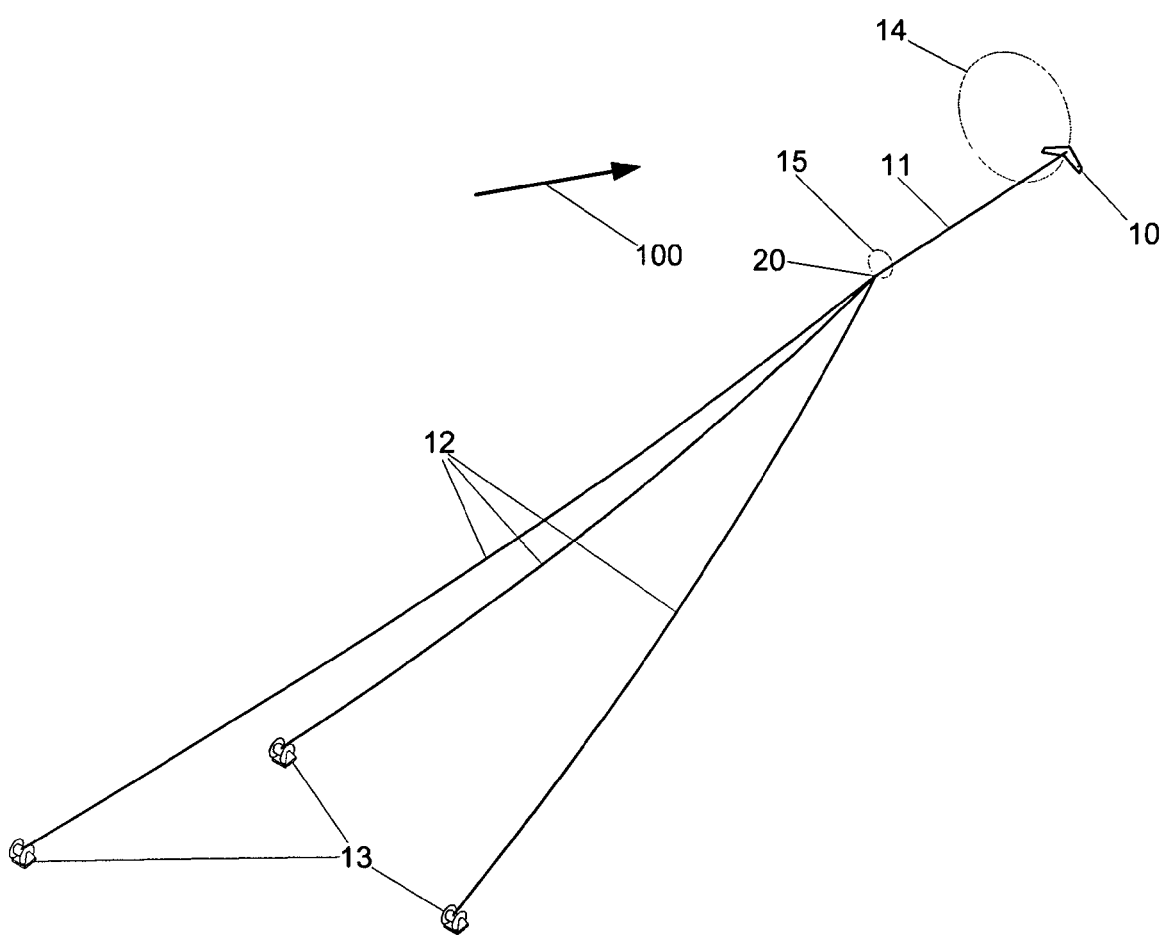
FIG. 3 is an illustration of a multi-tether kite according to an aspect of the inventive subject matter.
Figure 4:
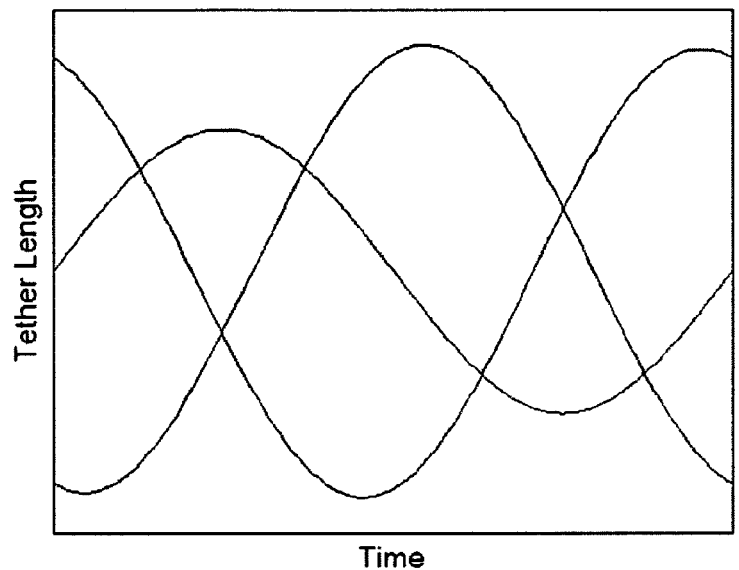
FIG. 4 is a plot of time vs. tether length for an embodiment of the kite of FIG. 3.

In FIG. 3, which shows a three-tether preferred embodiment, a kite 10 is attached to a secondary tether 11. The lower end of the secondary tether is attached by a joint 20 to the upper ends of each of two or more primary tethers 12, each of which is attached at its lower end to a ground-based spool 13. The ground-based spools are distributed on the ground, separated from each other by a distance. The kite flies a high-speed maneuvering pattern 14 approximately cross-ways to the wind, whose direction is indicated by the arrow 100, causing the lower end of the secondary tether to travel along a similar but smaller path 15. Since the distance between the kite and each ground-based spool changes in periodic way based on the geometry of the kite's orbit, each of the tethers must unwind and rewind on its spool in a periodic fashion. The ground-based spools are controlled in such a way that each tether unwinds under high tension and rewinds under low tension. The power generated while unwinding each tether under high tension exceeds the power absorbed in rewinding the same tether under low tension. When the power generation/absorption from all the spools are combined, the configuration generates continuous net power. FIG. 4 is a hypothetical graph vs time of the tether length over a single cycle for a 3-tether system.

Kites are contemplated herein to have any suitable dimensions. For example, commercially viable kites might have a wing area of at least 10 m$^2$, up to at least 100 m$^2$, 250 m$^2$, 500 m$^2$, 750 m$^2$, or more. In general, it is contemplated that the greater the wing area of the kite, the greater the economic benefit. In this instance, and where other upper limits are not expressly stated, the reader should infer a commercially reasonable upper limit.

Kites can be constructed of any suitable material or materials. Currently, the best choice is probably a carbon fiber composite. Weights of the kites could be anywhere from 10 kg to 10,000 kg or more.

Contemplated tethers can have any suitable length, including for example at least 1000 meters, 10,000 meters, 20,000 meters, or even 30,000 meters or more. Longer tethers allow operation at higher altitudes, which realistically could be 5000-10,000 meters. At some point the higher altitude offers little or no marginal benefit because the wind is not necessarily any stronger or more continuous.

Tethers can be made of any suitable material, including for example Kevlar™ because of its high strength to weight ratio.

Embodiments of the inventive subject matter have several advantages over prior art because they:

Locate power generation equipment on the ground, which reduces drag, weight, cost, and risk;

Generate continuous power;

Reduce the penalty of tether drag by minimizing the length of tether traveling at the high flight speeds of the maneuvering kite;

Are less complex than either the Ladder Mill or Kite Wind Generator; and

Allow greater energy extraction per kite than either the Ladder Mill or Kite Wind Generator concepts because they provide for high-speed crosswind maneuver patterns.

The multiple-tether concept can also simplify the launch of large-scale kites. Even in conditions where the ground-level wind is too light to sustain the kite, one of the spools could be used to tow the kite from its starting position on the ground into low altitude flight. The kite could then be maneuvered into an orbit where it repeatedly approaches and recedes from one or more of the ground-based spools. Whenever the kite is flying toward a spool, the spool motor is energized to increase tether tension; whenever the kite is flying away from a spool, the spool motor relaxes tension. Such an approach can increase the kite's kinetic energy, which can be used either to sustain a constant orbit or to climb to a higher altitude where the wind may be strong enough for the kite to self-sustain or generate net power.

Figure 5:
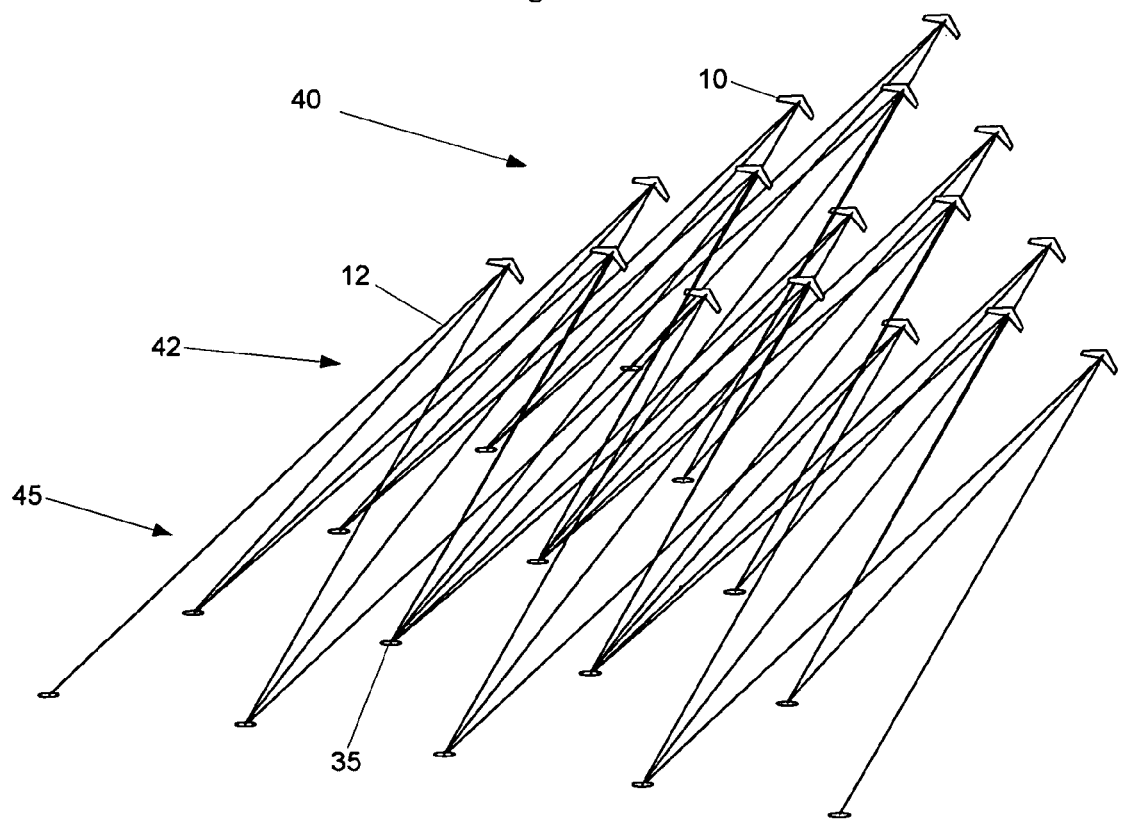
FIG. 5 is an illustration of a proposed stacking of tethered kites in a space-efficient manner.

Several of the inventive concepts herein lend themselves to modular scaling. For example, contemplated kites could be used in smaller or larger arrays similar to conventional terrestrial wind farms. FIG. 5 shows one possible arrangement, an array of sixteen three-tether systems distributed in a triangular pattern. In this arrangement, an array 40 of kites 10, is attached through a cluster 42 of tethers 12 to an array 45 of ground installations 35. Each ground installation 35 serves as the base for one, three, or six tethers, and the ground installations 35 are arranged in a triangular array 45. Whereas a single kite system requires three ground installations, a triangular array of sixteen three-tether kite systems requires only fifteen ground installations. A triangular array of one hundred three-tether kites will require sixty-six ground installations. In the limit of extremely large arrays, the number of ground installation is only slightly larger than half the number of kites. It is contemplated that such large arrays will operate most efficiently if the maneuver patterns of each kite can be synchronized across the array.

Figure 1:
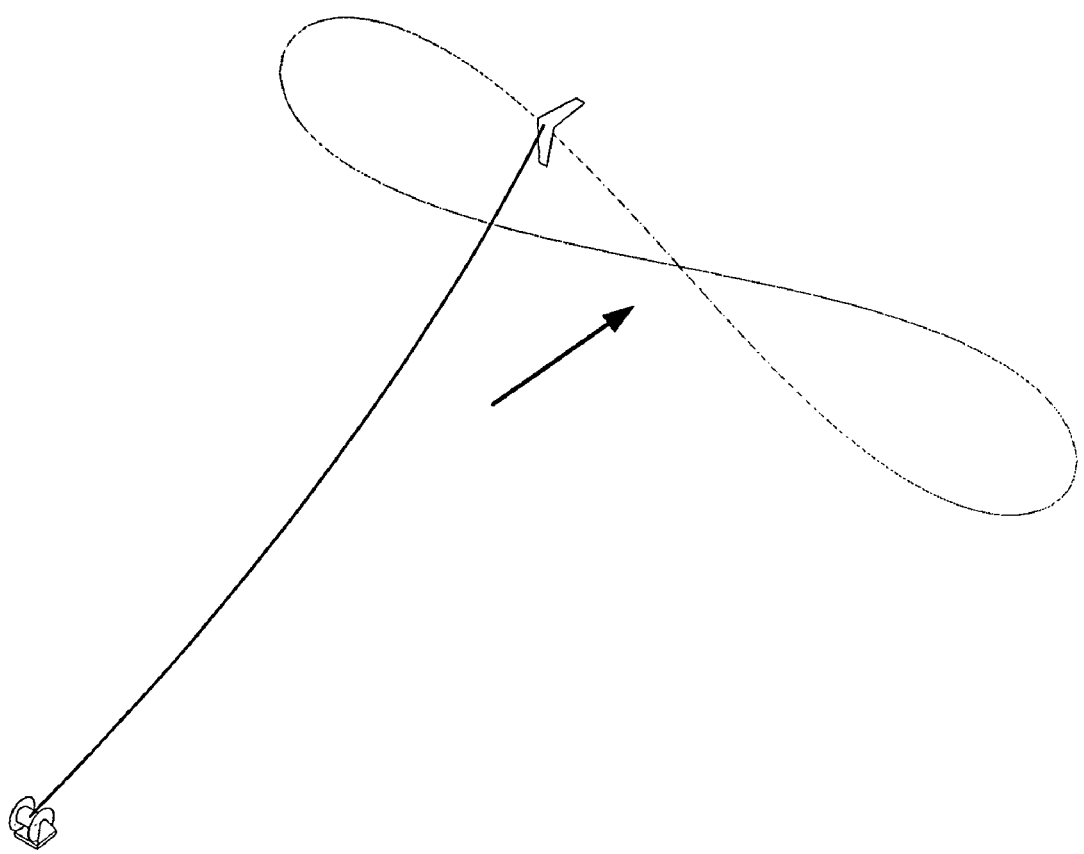
FIG. 1 is an illustration of a figure-eight flight pattern of a prior art energy-extracting kite.
Figure 2:
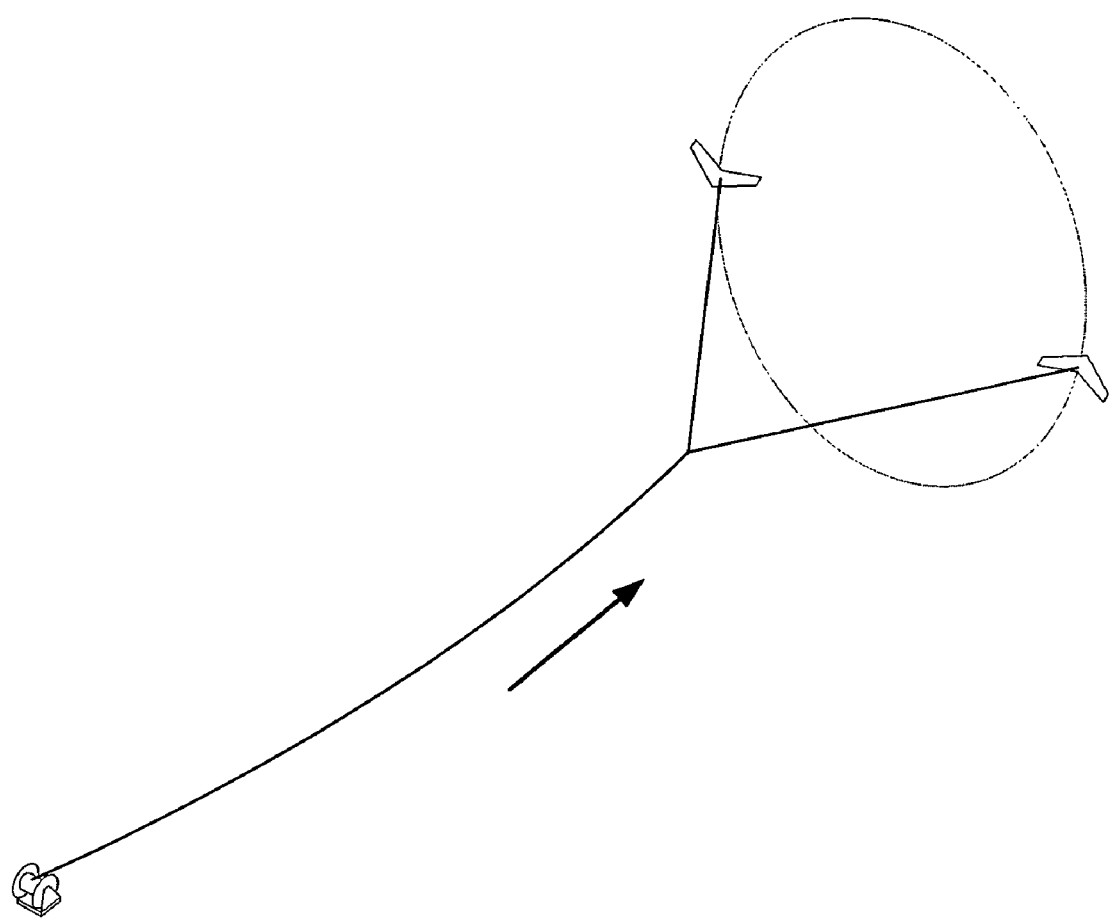
FIG. 2 is an illustration of a prior art "Y" harness used for reducing energy losses due to tether drag.
Figure 6:
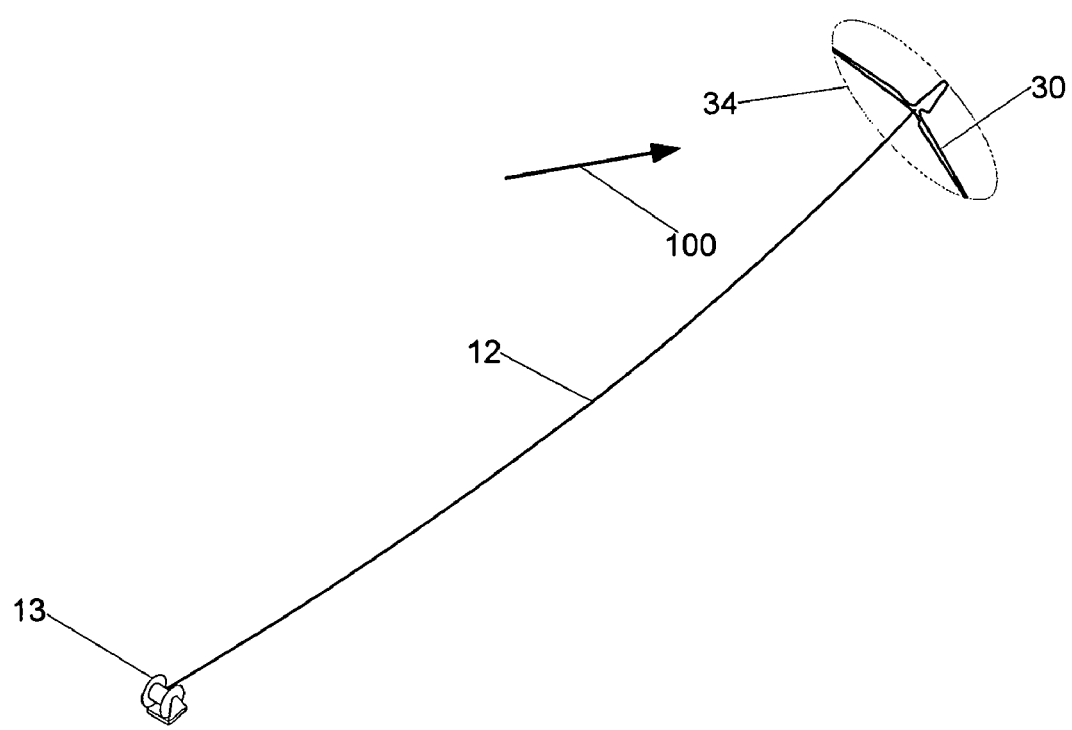
FIG. 6 is an illustration of an embodiment in which the kite includes a rotating rotor.

In FIG. 6, a kite 30 includes a rotor that rotates under power of the wind, with its blade tips scribing a circular path 34. Just as in the embodiment of FIG. 1, the kite is attached to a tether 12 which is in turn attached at its lower end to a ground spool 13. The direction of the wind is indicated with an arrow 100. Typical rotor diameters that would be commercially advantageous are contemplated to be in the range of between 10 and 100 meters. Unless a contrary intent is apparent from the context, all ranges recited herein are inclusive of their endpoints, and open-ended ranges should be interpreted to include only commercially practical values.

As with many kite power extraction methods, preferred embodiments allow efficient use of the underlying land because the ground generating facilities take up relatively little space, and the presence of the kites in the airspace above does not prevent additional land utilization in a variety of ways, including agriculture, nature preserve, or low-density recreation space.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for deriving energy from a kite, comprising:
    a flying kite tethered by first and second tethers, the tethers having bases separated by a distance of at least 1 meter such that translational movement of the kite causes a change in distance from the base of the first tether to the kite;
    a mechanism that derives power from the change in distance; and
    a third tether that tethers the flying kite, and has a base separated from each of the first and second tethers by a distance of at least 100 meters.

2. The system of claim 1, wherein the kite has a wing area of at least 10 m$^2$.

3. The system of claim 1, wherein the first tether has a length of at least 1000 m.

4. The system of claim 1, wherein the distance separating the bases of the tethers is at least 100 meters.

5. The system of claim 1, wherein during operation, the distance between the first base and the kite changes by least 50 meters during a cycle.

6. The system of claim 1, wherein the mechanism that derives power comprises an electric generator.

7. The system of claim 1, wherein the mechanism is located near the base of the first tether.

8. The system of claim 1, further comprising a second mechanism that derives power from a change in distance from the base of the second tether to the kite.

9. The system of claim 1, further comprising an airborne joint that couples the first and second tethers, and a secondary tether that couples the joint to the flying kite.

10. The system of claim 1, wherein the kite has a rotating rotor.

\* \* \* \* \*